US008483427B2

(12) United States Patent
Yang et al.

(10) Patent No.: US 8,483,427 B2
(45) Date of Patent: Jul. 9, 2013

(54) SYSTEM AND METHOD FOR IMAGE AUTHENTICATION

(75) Inventors: Lei Yang, Gainsville, FL (US); Jun Tian, Belle Meade, NJ (US); Dapeng Oliver Wu, Gainesville, FL (US); Hong Heather Yu, West Windsor, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 436 days.

(21) Appl. No.: 12/892,148

(22) Filed: Sep. 28, 2010

(65) Prior Publication Data

US 2012/0076422 A1    Mar. 29, 2012

(51) Int. Cl.
G06K 9/62    (2006.01)
(52) U.S. Cl.
USPC ............ 382/100; 382/112; 382/201; 382/218
(58) Field of Classification Search
None
See application file for complete search history.

(56) References Cited

U.S. PATENT DOCUMENTS

2010/0146231 A1* 6/2010 Gopalan et al. ............... 711/162
2011/0038545 A1  2/2011 Bober et al.

FOREIGN PATENT DOCUMENTS

| CN | 101079101 | 11/2007 |
|----|-----------|---------|
| CN | 101710334 | 5/2010 |
| WO | WO2009/130451 | 10/2009 |

OTHER PUBLICATIONS

Vishal Monga, A Clustering Based Approach to Perceptual Image Hashing, IEEE Transactions on Information Forensics and Security, 2006, pp. 1-15.*
Vishal Monga, Perceptually Based Methods for Robust Image Hashing, Doctor of Philosophy Dissertation, 2005, introductory pages and table of contents pp. i-xv, and body pp. 1-105.*
Dunn, J.C., "A Fuzzy Relative of the ISODATA Process and its Use in Detecting Compact Well-Separated Clusters," Cybernetics and Systems, 3: 3, 1973, pp. 32-37.
Bezdek, J.C., "Pattern Recognition with Fuzzy Objective Algorithms," 1981, pp. 65-70, Kluwer Academic Publishers, Norwell, MA.
Katutsky, J., et al., "Feature Point Detection in Blurred Images," Image and Vision Computing, International Conference, IVCNZ' 1998, 7 pages.
Bhattacharjee, S.K., et al., End-Stopped Wavelets for Detecting Low-Level Features, Proc. SPIE, Wavelet Applications in Signal and Image Processing VII, 1999, 10 pages.
Monga, V., "Perceptually Based Methods for Robust Image Hashing," Dissertation, University of Texas, Austin, Aug. 2005, 120 pages.
PCT International Search Report, Huawei Technologies Co., Ltd., et al., Application Serial No. PCT/CN2011/073908; mailed Aug. 18, 2011, 4 pages.

* cited by examiner

*Primary Examiner* — Brian P Werner
(74) *Attorney, Agent, or Firm* — Slater & Matsil, L.L.P.

(57) ABSTRACT

In accordance with an embodiment, a method of authenticating images includes electronically receiving an anchor image and a query image, performing a feature point extraction of an anchor image, and performing a feature point extraction of a query image. The method also includes clustering feature points of the anchor image and feature points of the query image, where clustering includes determining matching feature points, determining outlier feature points, and excluding outlier feature points. Whether the anchor image is similar to the query image is determined based on a distance between the feature points of the anchor image and the feature points of the query image. If the anchor image is similar to the query image, possible tampered areas of the query image based on the outlier feature points are identified.

22 Claims, 7 Drawing Sheets

SYSTEM AND METHOD FOR IMAGE AUTHENTICATION

TECHNICAL FIELD

The present invention relates generally to image processing, and more particularly to a system and method for image authentication.

BACKGROUND

As digital multimedia has become more pervasive, and the tools by which to modify digital multimedia has become more available, it has become increasingly easy to copy, modify, and propagate digital content such images and video files. With a simple Internet connection and image processing tools, a user can obtain, alter and modify a digital image in a matter of minutes. Because of the quality of the available software, these alterations may be virtually undetectable to the human eye. Such ease of alteration becomes problematic, for example, in situations where digital images are used for secure or sensitive applications such as electronic commerce, licensed media distribution, documentation of insurance claims, and the transmission of images used for legal evidence.

Image authentication and detection is an issue for media content providers with regard to the copying and alteration of content. For example, a media content provider may need to determine whether a copyrighted image has been used without permission, or a news organization may want to monitor other content providers to determine if an image is used without payment and/or attribution, even if the image has been scaled or modified.

In another respect, a media content provider may want to detect whether a licensee has altered an image. For example, on a given day, a large news organization may send hundreds of images and video clips to licensed online, broadcast, and print news organizations all over the world. Even if a licensee modifies an image in a way that is readily detectable, for example, by adding a logo or watermark to the corner of the image, the task of verifying that all licensees are distributing unaltered images is difficult, especially when the disseminated images are scaled or reformatted.

SUMMARY OF THE INVENTION

In accordance with an embodiment, a method of authenticating images includes electronically receiving an anchor image and a query image, performing a feature point extraction of an anchor image, and performing a feature point extraction of a query image. The method also includes clustering feature points of the anchor image and feature points of the query image, where clustering includes determining matching feature points, determining outlier feature points, and excluding outlier feature points. Whether the anchor image is similar to the query image is determined based on a distance between the feature points of the anchor image and the feature points of the query image. If the anchor image is similar to the query image, possible tampered areas of the query image based on the outlier feature points are identified.

In accordance with a further embodiment, a method of image hash generation includes electronically receiving an image, extracting feature points of the image, performing a pseudorandom permutation of the feature points to produced permutated feature points, calculating transform coefficients of the permutated feature points, and hashing the transform coefficients.

In accordance with a further embodiment, a non-transitory computer readable medium includes an executable program stored thereon. The program instructs a microprocessor to extract feature points of an anchor image, extract feature points of a query image, and cluster feature points of the anchor image and feature points of the query image. Clustering includes determining matching feature points, determining outlier feature points, and excluding outlier feature points. In an embodiment, the method further includes determining whether the anchor image is similar to the query image based on a distance between the feature points of the anchor image and the feature points of the query image. If the anchor image is similar to the query image based on the determining, possible tampered areas of the query image based on the outlier feature points are identified.

In accordance with a further embodiment, a non-transitory computer readable medium includes an executable program stored thereon. The program instructs a microprocessor to extract feature points of an image, perform a pseudorandom permutation of the feature points to produce permutated feature points, calculate transform coefficients of the permutated feature points, and quantize the transform coefficients. The microprocessor is also instructed to encode the quantized transform coefficients, and hash the encoded quantized transform coefficients.

In accordance with a further embodiment, a system for authenticating images includes a feature point extractor for extracting feature points of an anchor image and a query image, and a feature point clustering block coupled to the feature point extractor. The feature point clustering block clusters feature points of the anchor image and feature points of the query image, determines matching feature points of anchor image and feature points of the query image, determines outlier feature points, and outputs clustered feature points with the outlier feature points excluded. In an embodiment, the system also includes a feature point comparison block coupled to the feature point clustering block, where the feature point comparison block determines whether the anchor image is similar to the query image based on a distance between the feature points of the anchor image and the feature points of the query image. The system also includes a tampered area identification block coupled to the feature point comparison block and the feature point clustering block. The tampered area identification block identifies possible tampered areas of the query image based on the outlier feature points if the anchor image is similar to the query image.

In accordance with a further embodiment, a system for generating image hashing includes an image feature point extractor, a feature point permutation block coupled to the image feature point extractor, and a transform block coupled to the feature point permutation block, where the transform block calculates transform coefficients of permutated feature points. In an embodiment, the system also includes a quantizing block coupled to the transform block, an encoding block coupled to the quantizing block, and a hashing block coupled to the encoding block.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to various embodiments in a specific context, a system and method for image authentication. Embodiments of the invention may also be applied to other types of media where authentication and detection of alteration is needed.

In embodiments of the present invention, a content-based image authentication technique uses feature point clustering and spatial ordering. Normalized Euclidian distance, Hausdorff distance, histogram-weighted distance, and/or a Hamming distance of a generated hash are used to evaluate the distance between query images and anchor images. In one embodiment, if a query image is similar or has a small distance to an anchor or reference image, the possible tampered area in the query image is detected by an earth mover distance between local histogram of the query image and anchor image. In one embodiment, the detected tampered area is further labeled as a removed, changed or added area, and the percentage of the tampered area with respect to the total image is estimated. In a further embodiment, the hash generated from the feature points almost uniquely identifies an image. Embodiments of the present invention can be applied, for example, to image retrieval, video retrieval and authentication applications. Some embodiments provide a unified framework of image authentication, image hashing and tampering identification.

Figure 1:
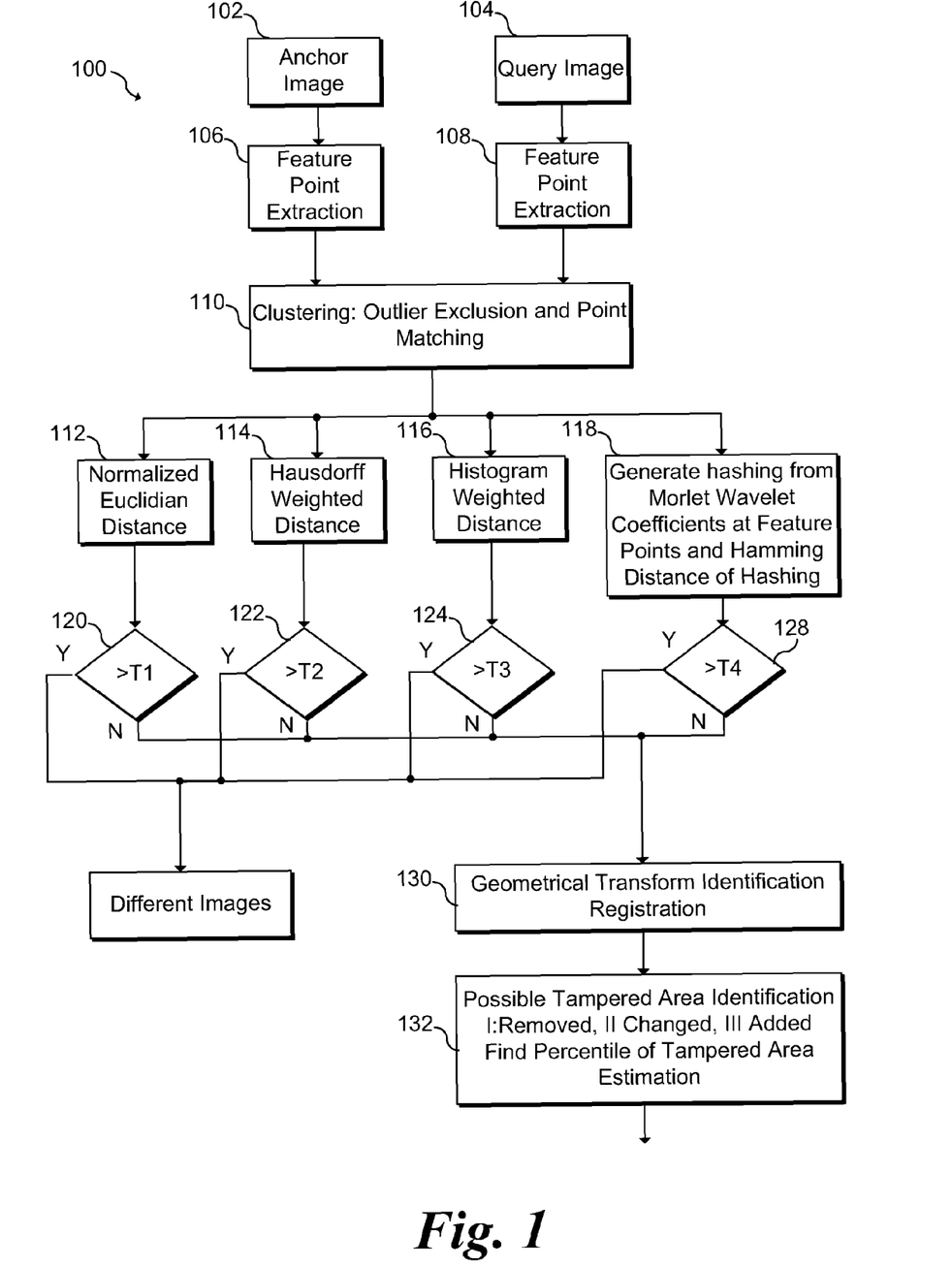
FIG. 1 illustrates an embodiment image authentication method.

FIG. 1 illustrates a block diagram of embodiment image authentication method 100. In steps 102 and 104 an anchor image and a query image are provided. In one embodiment, the anchor image is a reference image, and the query image is an image that is compared to the anchor image. For example, the anchor image can be a known authentic image, for which 100 is used to determine whether the query image is the similar to the anchor image and/or whether the query image has been changed or tampered with respect to the anchor image. Alternatively, the anchor and query images can be any two images designated for comparison.

In steps 106 and 108, feature points are extracted from the anchor image and the query image, respectively. In an embodiment, feature points are geometric descriptors of the contents of images. In one embodiment, a Klette's feature point extraction algorithm is used. This algorithm is described in *Feature Point Detection in Blurred Images*, by R. Klette et. al, Image and Vision Computing International Conference, 1998, which is incorporated herein by reference in its entirely. Klette's feature point extraction algorithm selects points that are in between two edges with an angle from the interval $$\left[\frac{\pi}{2} - d_a, \frac{\pi}{2} + d_a\right] \left[\frac{\pi}{2} - d_a, \frac{\pi}{2} + d_a\right]$$

in between regardless of its orientation, even when images are compressed, filtered, blurred or noisy. Alternatively, other algorithms can be used, for example, a Harris corner detection algorithm.

In an embodiment, the parameters used for the feature point extraction algorithm are chosen based on experimentation and/or methods described, for example in *Perceptually Based Methods for Robust Image Hashing*, by Vishal Monga, Thesis, Dept. of Electrical and Computer Engineering, The University of Texas at Austin, Austin, Tex. 78712, August 2005, which is incorporated herein by reference in its entirety. In an embodiment, the number of feature points is 64, the mean computation size is 4, the sign change size is 1, the distance to straight lines is 7, the angle difference allowance is 3, and the minimal distance between feature points is 8. In alternative embodiments, other parameters can be used.

Next, in step 110, feature points are clustered, outliers of feature points are ruled out, and feature point pairs are spatially aligned. Because of possible changes suffered by the query image, the feature points of the query image are often different from those of the anchor image, whether or not the query image and the anchor image are similar. In embodiments, possible missing, emerging and moving feature points may effect a distance evaluation. If the anchor image and the query image are similar, possible missing, emerging and moving feature points of the query image will enlarge the image difference and adversely affect the similarity judgment. If, on the other hand, the query image and the anchor image are totally different images, possible changes of feature points in the query image may decrease the distance between the two images, and degrade the discriminability of the system. In some embodiments, clustering step 110 can be used to improve the performance of an image authentication system.

In one embodiment, a Fuzzy C-Means Clustering algorithm is used to cluster the feature points. The Fuzzy C-Means Clustering algorithm is described, for example, in "A fuzzy relative of the ISODATA process and its use in detecting compact well-separated clusters," by J. Dunn, Cyternetics and Systems 3(3), pp. 32-57, 1973, and "Pattern recognition with fuzzy objective function algorithms," by J. Bezdek, Kluwer Academic Publishers, Norwell, Mass., USA, 1981. This algorithm is based on minimization of the following objective function:

$$J_m = \sum_{i=1}^{N} \sum_{j=1}^{C} u_{ij}^m \|x_i - c_j\|^2 \quad J_m = \sum_{i=1}^{N} \sum_{j=1}^{C} u_{ij}^m \|x_i - c_j\|^2 \tag{1}$$

where $1 \leq m < \infty$, $u_{ij}$ is the degree of membership of $x_i$ in the cluster J, $x_i$ is the ith feature point, $c_j$ is the jth center, and $\|\cdot\|$ is any norm describing the distance between any feature point and the center. The update of membership $u_{ij}$ and the cluster centers $c_j$ is performed as follows:

$$u_{ij} = \frac{1}{\sum_{k=1}^{C} \left(\frac{\|x_i - c_j\|}{\|x_i - c_k\|}\right)^{\frac{2}{m-1}}}, \tag{2}$$

where $$c_j = \frac{\sum_{i=1}^{N} u_{ij}^m \cdot x_i}{\sum_{i=1}^{N} u_{ij}^m}. \tag{3}$$

In an embodiment, outliers are defined as extra points in each cluster. For example, if there are n feature points of the anchor image in cluster j, and n+2 feature points of the query image in cluster j, then the extra 2 feature points in the query image with least degree of membership are regarded as outliers, and vice versa. In an embodiment, these points are not considered in the measurement of distance between the anchor image and the query image, and in the registration of two images. In some embodiments, however, these outlier points are used in a later step when determining whether the image has been changed or tampered. Alternatively, other clustering algorithms can be used, including, but not limited to density-based clustering and k-means clustering.

The remaining feature points are matched in pairs by cluster ordering and spatial ordering. Normally, given n feature points in the query image, the computational complexity is n! when finding the corresponding n feature points in the anchor image. After clustering and ruling out outliers, the computational complexity of feature point matching reduces to O (n log n), a measurement of computational cost, by cluster ordering and spatial ordering. In some embodiments cluster ordering is robust to outliers by increasing the similarity of similar images, and by increasing the distance between two different images.

In an embodiment, the feature point matching process processes feature points cluster by cluster. In each cluster, the feature points in two images are ordered spatially from left top of the image to the right bottom of the image in one embodiment. Alternatively, other ordering can be used, for example, the feature points can be ordered spatially from the right top of the image to the right left bottom of the image.

In an embodiment, four types of distance measurements are used to determine whether or not the anchor image and the query image are similar. The first type of distance is normalized Euclidean distance 112 between matched feature point pairs, which is evaluated in an embodiment by:

$$\frac{1}{n}\sum_{i=1}^{n} \|X_A^{(i)} - X_Q^{(i)}\|_E, \tag{4}$$

where n is the number of feature point pairs, $X_A^{(i)}$ is the coordinate of the ith feature point in the anchor image, $X_Q^{(i)}$ is the coordinate of the ith feature point in the query image, $\|\cdot\|_E \|\cdot\|_1 E$ is the Euclidean norm.

The second type of distance is Hausdorff distance 114 between the feature points of the query image and the anchor image. The Hausdorff distance is defined in an embodiment as:

$$H(X_A, X_Q) = \max(h(X_A, X_Q), h(X_Q, X_A)), \tag{5}$$

where, $$h(X_A, X_Q) = \max_{x \in X_A} \min_{y \in X_Q} \|x - y\|.$$

The third type of distance is histogram normalized distance 116, which is a perceptual based distance defined in an embodiment as:

$$\max\left(\frac{1}{n}\sum_{i=1}^{n} w_A^{(i)} \|X_A^{(i)} - X_Q^{(i)}\|_E, \frac{1}{n}\sum_{i=1}^{n} w_Q^{(i)} \|X_A^{(i)} - X_Q^{(i)}\|_E\right). \tag{7}$$

where n is the number of feature point pairs, $X_A^{(i)}$ is the coordinate of the ith feature point in the anchor image, $X_Q^{(i)}$ is the coordinate of the ith feature point in the query image, $w_A^{(i)}$ is the luminance percentile of the ith feature points in the anchor image, $w_Q^{(i)}$ is the luminance percentile of the ith feature points in the query image, and $\|\cdot\|_E \|\cdot\|_1 E$ is the Euclidean norm.

In one embodiment, the feature points' luminance has more percentiles in the histogram of luminance, therefore, the distances between these pairs of feature points using histogram normalized distance provides distance measurements that can be more reliable than other measurement types in some embodiments.

Figure 2:
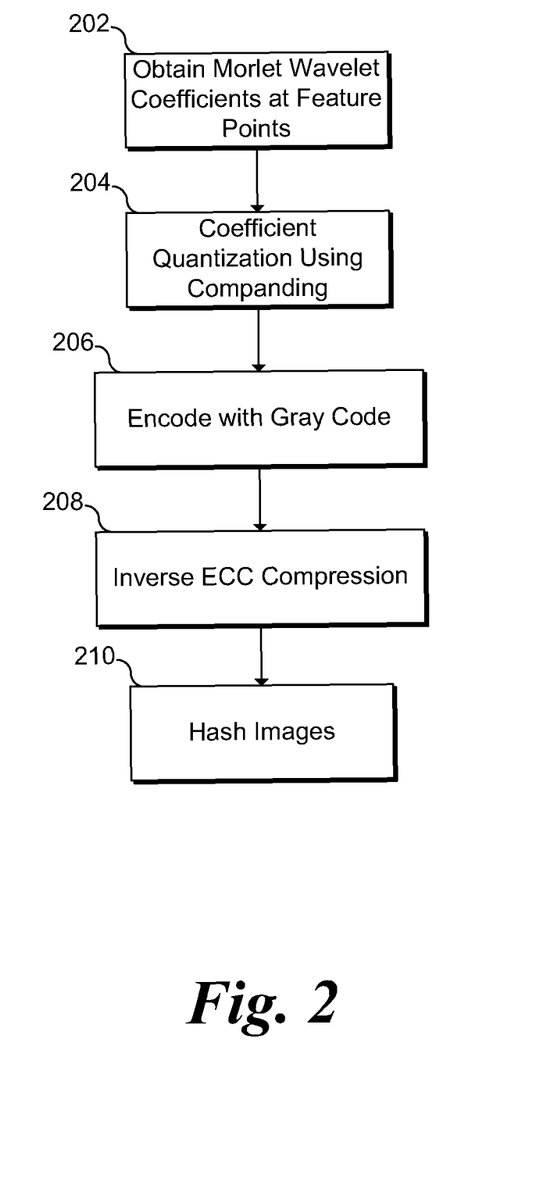
FIG. 2 illustrates an embodiment hashing method used in an image authentication method.

The fourth type of distance is the Hamming distance 118 between hash of the anchor image and the query image. In an embodiment, the hash is generated as shown in FIG. 2. In step 202, Morlet wavelet coefficients are calculated at each feature point. Here, the Morlet wavelet is used to detect linear structures perpendicular to the orientation of the wavelet. In one embodiment, the 2D Morlet wavelet is defined as:

$$\varphi_M(\vec{x}) = \left(e^{i\vec{k_0}\cdot\vec{x}} - e^{-\frac{1}{2}|\vec{k_0}|^2}\right)e^{-\frac{1}{2}|\vec{x}|^2}, \tag{8}$$

where $\vec{x} = (x_1, x_2)$ represents the 2D spatial coordinates, and $\vec{k}_0 = (k_1, k_2)$ is the wave-vector of the mother wavelet, which respectively determines the scale-resolving power and angular resolving power of the wavelet.

Next, in step 204, to obtain a binary sequence from the float Morlet wavelet coefficients of feature points, the coefficients are quantized using companding. The quantization levels are chosen based on the magnitudes of the Morlet wavelet coefficients. In an embodiment, quantization using companding can binarize the sequence as well as simplify the representation of hash with saved bits. In an embodiment, 16 quantization levels are used. Alternatively, greater or fewer quantization levels can be used.

In step 206, the binary sequence of the quantized Morlet Wavelet coefficients are then coded with Gray code, which, in an embodiment, shortens the Hamming distance between neighboring codes. Alternatively, other types of coding besides Gray coding can be used. In further embodiments, the Gray coding step can be omitted.

In step 208, the binary sequence is further compressed by inverse error correction coding (ECC), i.e. Viterbi decoding. Alternatively, other ECC techniques can be used. In further embodiments, ECC coding can be omitted. In step 210, the binary sequence is assigned as the hash.

Turning back to step 118 of FIG. 1, the Hamming distance is found between the hashed Morlet Wavelet coefficients of the anchor image and the hashed Morlet Wavelet coefficients of the query image.

In step 120, the normalized Euclidian distance is compared to a first threshold T1, in step 122, the Hausdorff weighed distance is compared to a second threshold T2, in step 124, the histogram weighted distance is compared to a third threshold T3, and in step 128 the Hamming distance of the hashed Morlet Wavelet coefficients is compared to fourth threshold T4. If any of these distances are greater their respective threshold, the query image is determined to be different from the anchor image. In an embodiment, if all of the distances are less then their respective thresholds, then the images are considered to be similar images. In a further embodiment, if all of the distances are zero, then the query image is considered to be identical to the anchor image. In an embodiment, T1=1.9, T2=0.4, T3=0.5 and T4=0.48. Alternatively, other values and ranges can be used for these thresholds. In an embodiment, these thresholds are determined by experiment and statistical analysis.

In alternative embodiments, greater or fewer distance methods besides normalized Euclidean distance 112, Hausdorff weighted distance 114, histogram weighted distance 116 and Hamming distance of hashed Morlet Wavelet coefficients can be used. For example, a subset of the four methods can be used, a subset of the four methods with at least one additional method can be used, or other distance methods known in the art can be used.

In an embodiment, if the two images are considered similar, possible attacks suffered by the query image are further identified. In step 130, a geometrical transform identification registration is performed to correct for rotation, translation and scaling differences between the anchor image and the query images. First, an iterative close point (ICP) algorithm is used to estimate the rotation and translation based on the feature point pairs. The query image is then recovered from the rotation and translation transform. In one embodiment, the ratio of the standard deviation of feature points of the query image to the standard deviation of feature points of the anchor image is used to estimate the possible scaling transform after rotation and translation registration. Alternatively, an ICP, Kanade-Lucas-Tomasi (KLT) feature tracker, scale invariant feature transform (SIFT), or other algorithm can be used.

In step 132, possible tampered areas are detected, and the percentage of the tampered areas is estimated. The tampered areas are determined by the distance between a local histogram around the feature points of two images. In one embodiment, an earth mover distance (EMD) is used to determine the tampered areas. Alternatively, other techniques such as Hausdorff distance can be used.

In an embodiment, the tampered areas are divided into three categories: I) removing an existing feature, II) changing an existing feature, and III) adding a new feature. Removed features are identified from the outlier feature points of the anchor image that do not appear in the query image. If the EMD between local histogram around feature point in the anchor image and the local histogram of the corresponding area in the query image is larger than a threshold, the area in the query image is considered as feature removed area. Changed areas are similarly detected between feature point pairs in the anchor image and the query image similarly. If the EMD between local histogram around a feature point in the anchor image and the local histogram of the corresponding area in the query image is larger than a threshold, and there are no outliers in either the anchor image or the query image, the area in the query image is considered as feature changed area. Feature fabricated areas are detected around the outlier feature points in the query image and corresponding location in the anchor image. After possible tampered areas are detected, the tampered areas are summed up, and the ratio of the sum of the tampered areas to the area of the whole image is calculated to find the percentage of tampered area.

In some embodiments, method 100 can be used for frame level authentication of video, as well as image authentication. Method 100 can also be used within a unified framework of image authentication, image hashing and tampering identification.

Figure 3:
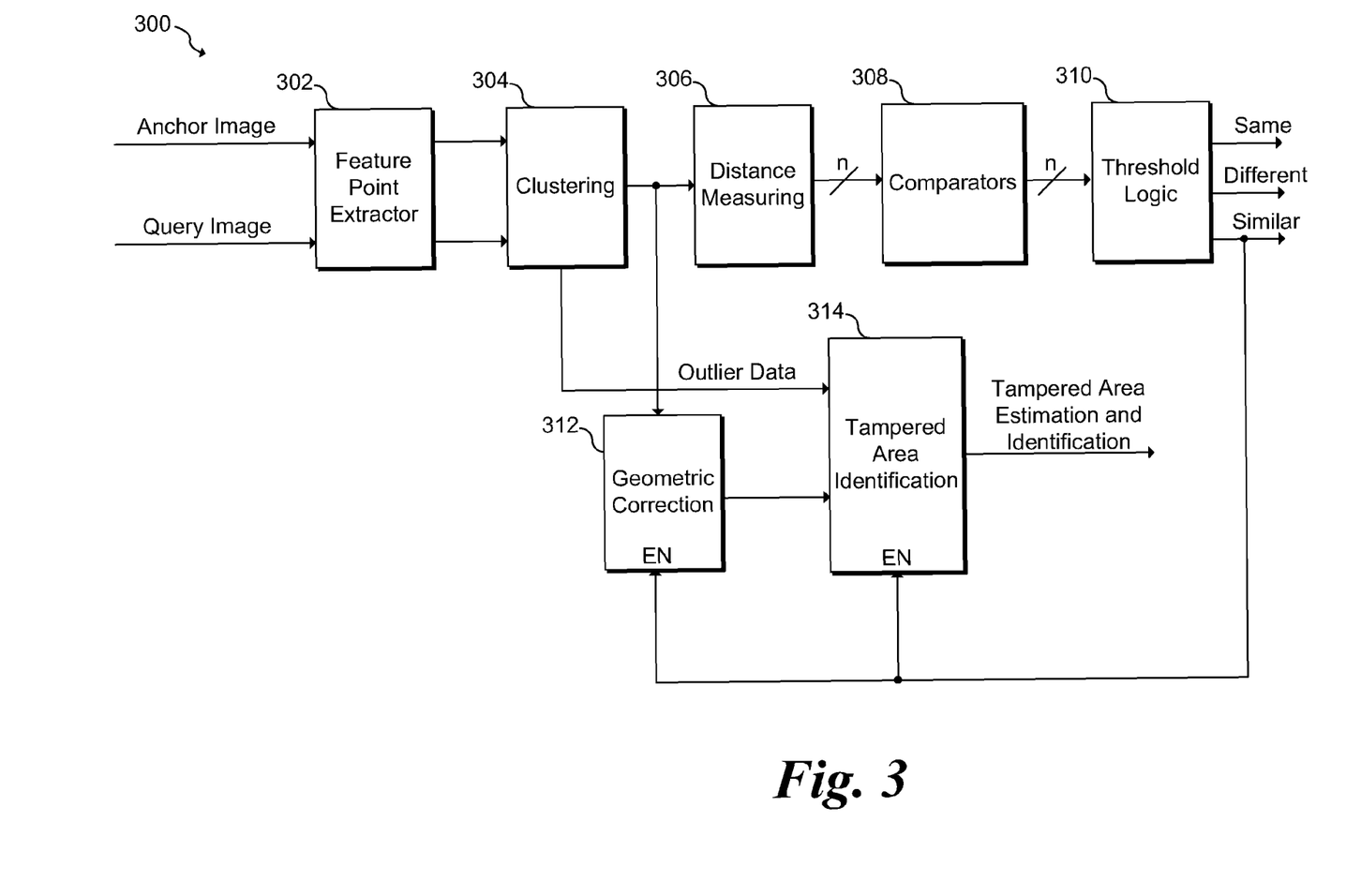
FIG. 3 illustrates an embodiment image authentication system.

FIG. 3 illustrates an embodiment image authentication system for comparing a query image with an anchor image. Feature point extractor 302 extracts feature points from the anchor image and the query image according to methods described above. Clustering block 304 takes the output of feature point extractor 302 performs clustering and identifies outlying feature points as described in above embodiments. Distance measuring block 306 calculates the distance between the clustered extracted feature points, comparators 308 compare the distance measurements of block 306 with thresholds, and threshold logic 310 processes the output of comparators 308 to provide a determination of whether the query image is the same as, different from or similar to the anchor image.

In an embodiment, geometric correction block 312 corrects for rotation, translation and scaling differences between the anchor image and the query images as described in embodiments above. Tampered area identification block 314 identifies tampered areas, determines whether the tampered areas are removed, changed, or added features, and provides a percentage metric of tampered area as described in embodiments above. In an embodiment, outlier data from clustering block 304 is used by tampered area identification block 314 to identify tampered areas. In one embodiment, geometric correction block 312 and tampered area identification block 314 are enabled when threshold logic 310 determines that the query image is similar to the anchor image.

In an embodiment, system 300 can be implemented, for example, using a general purpose computer running a software program, a microprocessor, or specialized hardware implemented, for example, on a circuit board or an integrated circuit. In one embodiment, a digital signal processor is used to implement the blocks in FIG. 3. In further embodiments, a combination of circuits including but not limited to, for example, microprocessors, memory devices, custom circuitry, application specific integrated circuits (ASICs), and general purpose integrated circuits can be used.

Figure 4:
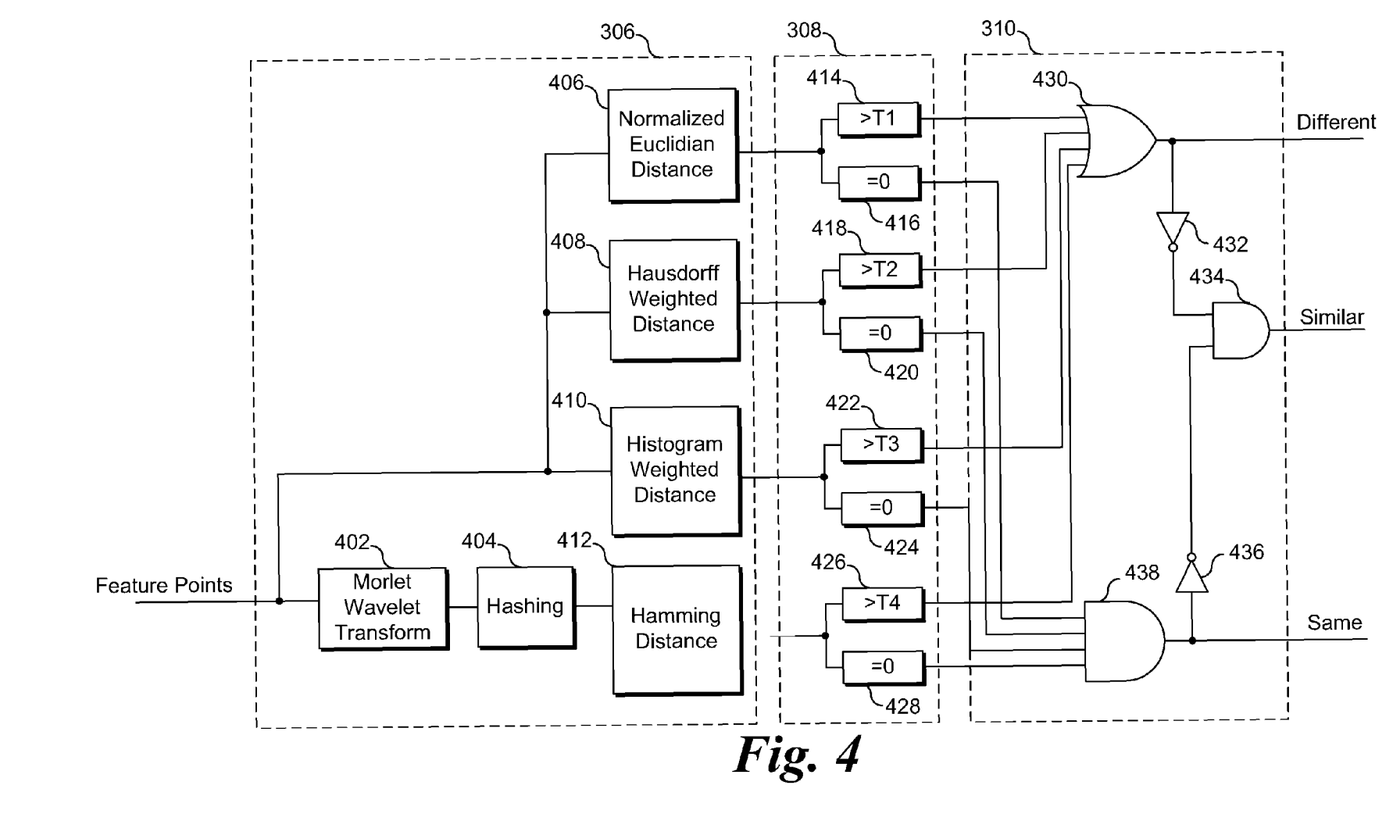
FIG. 4 illustrates an embodiment image distance measurement system.

FIG. 4 illustrates a system diagram showing details of distance measuring block 306, comparators 308 and threshold logic 310 of FIG. 3. In an embodiment, distance measurement block 306 has four measurement channels including normalized Euclidian distance measurement block 406, and Hausdorff weighted distance measurement block 408, histogram weighted measurement block 410. These blocks operate according to their respective measurement methods described above. A fourth measurement channel includes Morlet waveform transform block 402, hashing block 404 and Hamming distance measurement block to perform a Hamming distance of hashed Morlet Wavelet coefficients as described above.

Comparator block 308 includes comparators 414, 416, 418, 420, 422, 424, 426 and 428. Comparator 414 compares the output of normalized Euclidian distance block 406 to threshold T1, comparator 418 compares the output of Hausdorff weighted distance block 408 to threshold T2, comparator 422 compares the output of histogram weighted distance block 410 to threshold T3, and comparator 426 compares the output of Hamming distance block 412 to threshold T4. The output of all distance measurement blocks are compared to zero via comparators 416, 420, 424 and 428.

In an embodiment, logic block 310 determines that the query image is the same as the anchor image if the output of all distance measuring blocks is zero, as represented by AND gate 438 coupled to the outputs of comparators 416, 420, 424 and 428. The images are determined to be different if at least one of the distance measurements exceeds a threshold, as represented by OR gate 430. Finally, the images are determined to be similar if none of the distances exceeds their corresponding threshold and at least one distance measurement is non-zero, as represented by AND gate 434 and inverters 432 and 436. It should be appreciated that the logic shown in block 310 can be implemented in many alternative logically equivalent or logically similar ways. The logic of block 310 can be implemented using, for example, software, a lookup table, programmable logic, or other implementations.

In one embodiment, distance measuring block 306, comparator block 308 and logic block 310 are implemented by software running on processor. Alternatively, these blocks can be implemented by programmable or dedicated hardware circuits. In even further embodiments, these blocks can be implemented using digital, analog, and/or mixed signal implementations.

Figure 5:
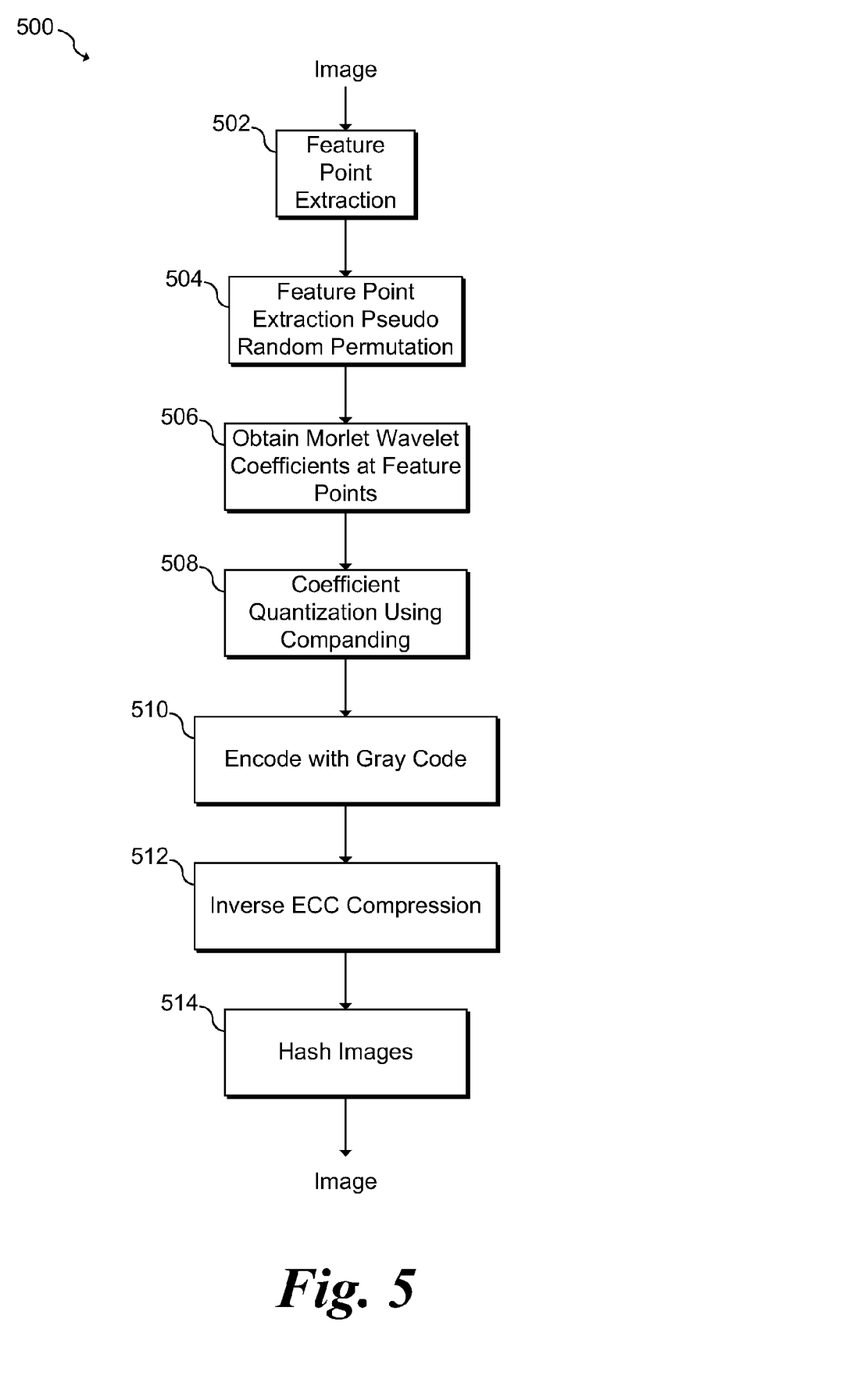
FIG. 5 illustrates an embodiment hashing method.

FIG. 5 illustrates embodiment hash generation method 500. In an embodiment, method 500 can be used to generate a short image hash that can be used to authenticate an image. For example, in one embodiment, 100 bytes of hash can be generated for 2 gigabytes of content. In one scenario, the originator of the image can send an image file along with the hash. The receiver of the image then generates a hash using an embodiment hashing algorithm, or an embodiment hashing algorithm using a secure key. If the hash generated by the receiver matches the hash generated by the sender, the receiver has a high level of confidence that the received image is an untampered version of the originally sent image.

Method 500 first performs feature point extraction 502 of an input image according to methods described above. Next, in step 504, a pseudo random permutation of the feature points is performed. In one embodiment, the pseudo random permutation is performed by re-ordering the two-dimensional feature points into a one-dimensional feature point list, and then performing a pseudo-random permutation of the one-dimensional list. In some embodiments, these feature points are pseudo-randomly permutated using a secret key determined by the users to increase the security of the generated hashing.

In step 506, Morlet Wavelet coefficients are calculated for the feature points according to methods described above. In step 508, the Morlet Wavelet coefficients are quantized and optionally companded. The quantized coefficients are then optionally encoded using a Gray Code in step 510 and an optional inverse ECC compression is performed in step 512 as described above in embodiment methods. The encoded and compressed images are the hash (step 514).

Figure 6:
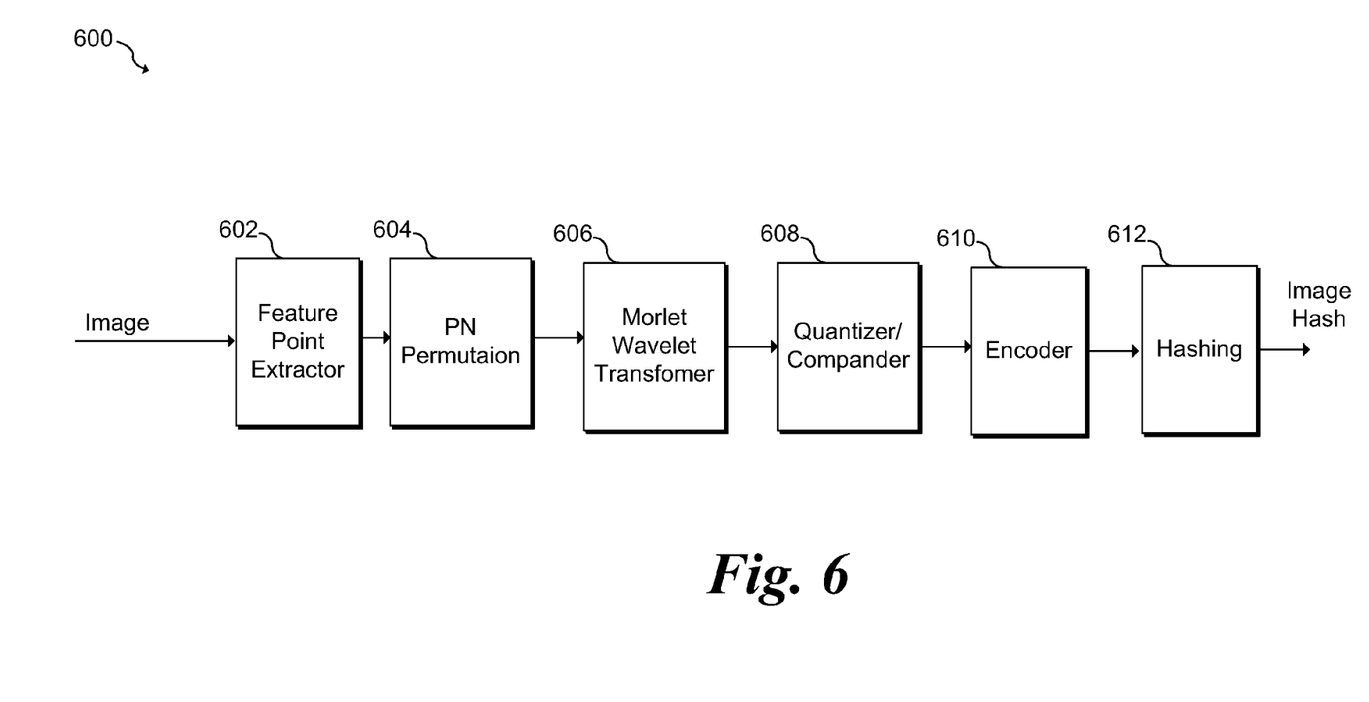
FIG. 6 illustrates an embodiment image hashing system.

FIG. 6 illustrates embodiment hashing system 600 for performing the hashing method shown in FIG. 5. Feature point extractor 602 extracts feature points from the input image, and PN permutation block 604 performs a pseudo-random permutation. In one embodiment, this pseudo-random permutation is performed according to a secure key. Morlet Wavelet Transformer 606 produces Morlet Wavelet coefficients, which are quantized and optionally companded by quantized/compander block 608. The quantized coefficients are encoded by encoder 610, which, in one embodiment, encodes the coefficients with a Gray code and compresses the coefficients using an inverse ECC compression. Alternatively, encoder block 610 can be omitted. Lastly, hashing block 612 hashes the quantized and encoded Morlet Wavelet coefficients to produce the image hash.

Figure 7:
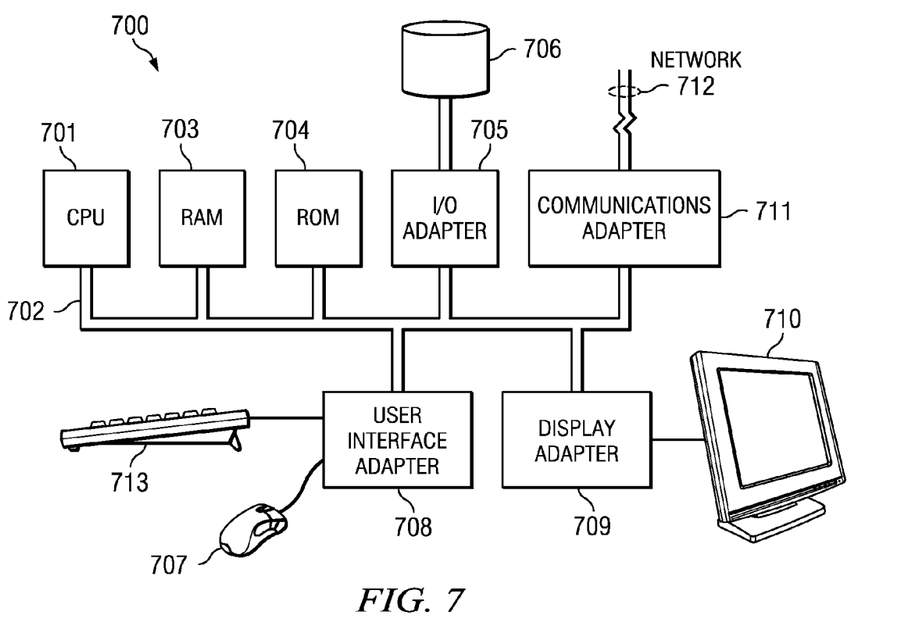
FIG. 7 illustrates a computer system for implementing embodiment methods.

FIG. 7 illustrates computer system 700 adapted to use embodiments of the present invention, e.g., storing and/or executing software associated with the embodiments. Central processing unit (CPU) 701 is coupled to system bus 702. CPU 701 may be any general purpose CPU. However, embodiments of the present invention are not restricted by the architecture of CPU 701 as long as CPU 701 supports the inventive operations as described herein. Bus 702 is coupled to random access memory (RAM) 703, which may be SRAM, DRAM, or SDRAM. ROM 704 is also coupled to bus 702, which may be PROM, EPROM, or EEPROM. RAM 703 and ROM 704 hold user and system data and programs as is well known in the art.

Bus 702 is also coupled to input/output (I/O) adapter 705, communications adapter 711, user interface 708, and display adaptor 709. The I/O adapter 705 connects storage devices 706, such as one or more of a hard drive, a CD drive, a floppy disk drive, a tape drive, to computer system 700. The I/O adapter 705 is also connected to a printer (not shown), which would allow the system to print paper copies of information such as documents, photographs, articles, and the like. Note that the printer may be a printer, e.g., dot matrix, laser, and the like, a fax machine, scanner, or a copier machine. User interface adaptor is coupled to keyboard 713 and mouse 707, as well as other devices. Display adapter, which can be a display card in some embodiments, is connected to display device 710. Display device 710 can be a CRT, flat panel display, or other type of display device.

Advantages of embodiments of the present invention include an image authentication feature extraction that is more robust to geometric attacks than other statistics based descriptors. Embodiment feature point extraction is also useful for video registration and identifying possible underlying geometrical or non-geometrical attacks.

Advantages of some embodiments include a matching method that is robust even when feature points are moved due to possible noise or attack. In an embodiment, spatial matching by diagonal ordering is optimal to row first or column first ordering in terms of correct matching. In some embodiments, this leads to small distances between similar images and large distances between different images.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of authenticating images, the method comprising:
    electronically receiving an anchor image and a query image;
    performing a feature point extraction of an anchor image;
    performing a feature point extraction of a query image;
    clustering feature points of the anchor image and feature points of the query image, clustering comprising determining matching feature points, determining outlier feature points, and excluding outlier feature points;
    determining whether the anchor image is similar to the query image based on a distance between the feature points of the anchor image and the feature points of the query image; and
    if the anchor image is similar to the query image based on the determining, identifying possible tampered areas of the query image based on the outlier feature points.

2. The method of claim 1, further comprising correcting for geometric transformation before identifying possible tampered areas.

3. The method of claim 1, wherein determining whether the anchor image is similar to the query image comprises:
    determining a plurality of distances between the feature points of the anchor image and the feature points of the query image, wherein each of the plurality of distances uses a respective one of a plurality of different distance determining methods;
    comparing each of the plurality of distances to a respective threshold; and
    determining that the anchor image is similar to the query image if each of the plurality of distances not greater than their respective threshold.

4. The method of claim 3, wherein determining whether the anchor image is similar to the query image further comprises:
    determining that the anchor image is different from the query image if at least one of the plurality of distances is greater than their respective threshold; and
    determining that the anchor image is the same as the query image if all of the plurality of distances are zero.

5. The method of claim 3, wherein the plurality of different distance determining methods comprise calculating a normalized Euclidean distance, calculating a Hausdorff distance, calculating a histogram weighted distance, and/or calculating a Hamming distance of transformed coefficient feature points.

6. The method of claim 5, wherein determining the Hamming distance of transformed coefficient feature points comprises:
    calculating Morlet wavelet coefficients from the feature points of the anchor image and the feature points of the query image;
    generating hashing from the Morlet wavelet coefficients; and
    calculating the Hamming distance of the hashing.

7. The method of claim 3, wherein the plurality of different distance determining methods comprise calculating a normalized Euclidean distance, calculating a Hausdorff distance, calculating a histogram weighted distance, and calculating a Hamming distance of transformed coefficient feature points.

8. The method of claim 1, wherein identifying possible tampered areas of the query image based on the outlier feature points comprises:
    identifying at least one area of the query image that has been moved, changed or added with respect to the anchor image.

9. The method of claim 1, further comprising providing a percentile indication of identified possible tampered areas.

10. The method of claim 1, wherein clustering feature points comprises using a Fuzzy C-Means clustering algorithm.

11. A non-transitory computer readable medium with an executable program stored thereon, wherein the program instructs a microprocessor to perform the following steps:
    extracting feature points of an anchor image;
    extracting feature points of a query image;
    clustering feature points of the anchor image and feature points of the query image, clustering comprising determining matching feature points, determining outlier feature points, and excluding outlier feature points;
    determining whether the anchor image is similar to the query image based on a distance between the feature points of the anchor image and the feature points of the query image; and
    if the anchor image is similar to the query image based on the determining, identifying possible tampered areas of the query image based on the outlier feature points.

12. The non-transitory computer readable medium of claim 11, wherein the program further instructs the microprocessor to perform a step of correcting for a geometric transformation before identifying possible tampered areas.

13. The non-transitory computer readable medium of claim 11, wherein the step of determining whether the anchor image is similar to the query image comprises:
    determining a plurality of distances between the feature points of the anchor image and the feature points of the query image, wherein each of the plurality of distances uses a respective one of a plurality of different distance determining methods;
    comparing each of the plurality of distances to a respective threshold; and
    determining that the anchor image is similar to the query image if each of the plurality of distances not greater than their respective threshold.

14. The non-transitory computer readable medium of claim 13, wherein the step of determining whether the anchor image is similar to the query image further comprises:
    determining that the anchor image is different from the query image if at least one of the plurality of distances is greater than their respective threshold; and
    determining that the anchor image is the same as the query image if all of the plurality of distances are zero.

15. The non-transitory computer readable medium of claim 13, wherein the plurality of different distance determining methods comprise calculating a normalized Euclidean distance, calculating a Hausdorff distance, calculating a histogram weighted distance, and/or calculating a Hamming distance of transformed coefficient feature points.

16. The non-transitory computer readable medium of claim 15, wherein the step of determining the Hamming distance of transformed coefficient feature points comprises:
    calculating Morlet wavelet coefficients from the feature points of the anchor image and the feature points of the query image;

generating hashing from the Morlet wavelet coefficients; and calculating the Hamming distance of the hashing.

17. The non-transitory computer readable medium of claim 11, wherein the step of identifying possible tampered areas of the query image based on the outlier feature points comprises:

identifying at least one area of the query image that has been moved, changed or added with respect to the anchor image; and providing a percentile indication of identified possible tampered areas.

18. A system for authenticating images comprising:

a feature point extractor for extracting feature points of an anchor image and a query image;

a feature point clustering block coupled to the feature point extractor, wherein the feature point clustering block clusters feature points of the anchor image and feature points of the query image, determines matching feature points of anchor image and feature points of the query image, determines outlier feature points, and outputs clustered feature points with the outlier feature points excluded;

a feature point comparison block coupled to the feature point clustering block, wherein the feature point comparison block determines whether the anchor image is similar to the query image based on a distance between the feature points of the anchor image and the feature points of the query image; and a tampered area identification block coupled to the feature point comparison block and the feature point clustering block, wherein the a tampered area identification block identifies possible tampered areas of the query image based on the outlier feature points if the anchor image is similar to the query image.

19. The system of claim 18, further comprising a geometric transformation corrector coupled between the feature point clustering block and the tampered area identification block, wherein geometric transformation corrector corrects for a geometric transformation of the query image with respect to the anchor image.

20. The system of claim 18, wherein the feature point comparison block comprises:

a plurality of distance calculation blocks calculating a distance between the feature of the anchor image and the feature points of the query image, wherein each one of the plurality of distance calculation blocks uses a different distance calculation algorithm from other ones of the plurality of distance calculation blocks, each of the plurality of distance calculation blocks comprises a comparator comparing a calculated distance with a predetermined threshold; and a comparison block coupled to the plurality of distance calculation block, wherein the comparison block determines that the query image is similar to the anchor image if the calculated distance is less than the predetermined threshold in for each of the plurality of distance calculation blocks.

21. The system of claim 20, wherein:

a first one of the distance calculation blocks calculates a normalized Euclidean distance;

a second one of the distance calculation blocks calculates a Hausdorff distance;

a third one of the distance calculation blocks calculates a histogram weighted distance; and a fourth one of the distance calculation blocks calculates a Hamming distance of transformed coefficient feature points.

22. The system of claim 21, wherein the fourth one of the distance calculation blocks:

calculated Morlet wavelet coefficients from the feature points of the anchor image and the feature points of the query image;

generates hashing from the Morlet wavelet coefficients; and calculates the Hamming distance of the hashing.

* * * * *